(12) United States Patent
Tani et al.

(10) Patent No.: US 9,249,712 B2
(45) Date of Patent: Feb. 2, 2016

(54) AIR-FUEL RATIO CONTROL SYSTEM FOR INTERNAL COMBUSTION ENGINE

(75) Inventors: Michinori Tani, Saitama-ken (JP);
Kenichi Maeda, Saitama-ken (JP);
Atsuhiro Miyauchi, Saitama-ken (JP);
Seiji Watanabe, Saitama-ken (JP);
Soichiro Goto, Saitama-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1052 days.

(21) Appl. No.: 13/158,192

(22) Filed: Jun. 10, 2011

(65) Prior Publication Data
US 2011/0314795 A1 Dec. 29, 2011

(30) Foreign Application Priority Data

Jun. 25, 2010 (JP) .................................. 2010-144486
Dec. 24, 2010 (JP) .................................. 2010-287552

(51) Int. Cl.
*F02B 27/04* (2006.01)
*F01N 11/00* (2006.01)
*F02D 41/14* (2006.01)
*F02D 41/24* (2006.01)

(52) U.S. Cl.
CPC ............ *F01N 11/00* (2013.01); *F02D 41/1403* (2013.01); *F02D 41/149* (2013.01); *F02D 41/1482* (2013.01); *F02D 41/2454* (2013.01); *F01N 2560/025* (2013.01); *F02D 41/1441* (2013.01); *Y02T 10/47* (2013.01)

(58) Field of Classification Search
CPC . F01N 11/00; F01N 2560/025; F02D 41/149; F02D 41/1482

USPC .............................. 60/276; 701/103, 104, 109
See application file for complete search history.

(56) References Cited

U.S. PATENT DOCUMENTS

2007/0204596 A1 * 9/2007 Takubo ........................... 60/276
2008/0295488 A1 * 12/2008 Takubo ........................... 60/276

FOREIGN PATENT DOCUMENTS

| JP | 2003-214146 A | 7/2003 |
| JP | 2003-214223 A | 7/2003 |
| JP | 3961275 B2 | 8/2007 |
| JP | 2008-075495 A | 4/2008 |

* cited by examiner

*Primary Examiner* — Audrey K Bradley
*Assistant Examiner* — Jason Sheppard
(74) *Attorney, Agent, or Firm* — Mori & Ward, LLP

(57) ABSTRACT

An air-fuel ratio control system for an internal combustion engine, which, at the resumption of air-fuel ratio feedback control, is capable of setting the initial value of an integral term of the feedback control to a value properly learned in preceding feedback control, thereby enabling improvement of control accuracy. To feedback-control the output value of an O2 sensor to a target value, a target air-fuel ratio is calculated. During the feedback control, when it is determined that a predetermined condition in which it is estimated that exhaust gas air-fuel ratio upstream of the catalyst is excellently reflected on an exhaust gas air-fuel ratio at a location midway or downstream of the catalyst is satisfied, an adaptive law input calculated immediately before interruption of the feedback control is updated and stored as the initial value of an integral term for the following execution of the feedback control.

12 Claims, 11 Drawing Sheets

AIR-FUEL RATIO CONTROL SYSTEM FOR INTERNAL COMBUSTION ENGINE

BACKGROUND OF THE INVENTION

1. Field of the Invention

The present invention relates to an air-fuel ratio control system for an internal combustion engine, for feedback-controlling an output value of an air-fuel ratio sensor that is disposed at a location midway or downstream of a catalyst in an exhaust passage of the engine such that the output value becomes equal to a target value.

2. Description of the Related Art

Conventionally, there has been known an air-fuel ratio control system for an internal combustion engine, which is disclosed e.g. in Japanese Patent No. 3961275. The engine has an exhaust passage provided with an exhaust purification device for purifying exhaust gases and an air-fuel ratio sensor disposed at a location upstream of the exhaust purification device. The air-fuel ratio sensor is of a type which linearly detects an air-fuel ratio of an air-fuel mixture based on the concentration of oxygen in exhaust gases.

This air-fuel ratio control system calculates a basic fuel injection amount and sets a target air-fuel ratio, according to operating conditions of the engine, and calculates, when conditions for performing feedback control are satisfied, a feedback correction coefficient by the feedback control such that the air-fuel ratio detected by the air-fuel ratio sensor becomes equal to the target air-fuel ratio. Then, a final fuel injection amount is calculated by multiplying the above-mentioned basic fuel injection amount by the target air-fuel ratio and the feedback correction coefficient, and the air-fuel ratio is controlled using the final fuel injection amount.

Further, when resuming the feedback control after interruption thereof, the air-fuel ratio control system sets the integral term of the feedback control to a predetermined initial value set in advance according to the operating conditions of the engine, and holds the same at the initial value for a predetermined time period thereafter, whereby the controlled variable of the feedback control is properly calculated when resuming the feedback control.

In the above-described conventional air-fuel ratio control system, however, at the resumption of the feedback control and for the predetermined time period thereafter, the integral term of the feedback control is always set to the predetermined initial value dependent on the operating conditions of the engine. No learning results of the integral term calculated according to the injection characteristics of the fuel injection valve during the preceding execution of the feedback control are reflected on the initial value at all, and hence there is a fear that the feedback control is started in a state where the integral term is quite different from an appropriate value. In this case, there occurs a delay before the integral term reaches an appropriate value, and hence it is impossible to properly calculate the controlled variable of the feedback control during the time period, which results in the degraded accuracy of the air-fuel ratio control.

SUMMARY OF THE INVENTION

It is an object of the present invention to provide an air-fuel ratio control system for an internal combustion engine, which, at the resumption of air-fuel ratio feedback control, is capable of setting an initial value of an integral term of the feedback control to a value properly learned in preceding execution of the feedback control, thereby making it possible to improve the accuracy of the air-fuel ratio feedback control.

To attain the above object, the present invention provides an air-fuel ratio control system for an internal combustion engine, comprising a catalyst disposed in an exhaust passage of the engine, for purifying exhaust gases, an air-fuel ratio sensor disposed at a location midway or downstream of the catalyst in the exhaust passage, for detecting an air-fuel ratio of exhaust gases, control input-calculating means for calculating a control input including an integral term, for feedback-controlling an output value of the air-fuel ratio sensor such that the output value becomes equal to a target value, when a predetermined feedback control condition is satisfied, condition satisfaction-determining means for determining during the feedback control whether or not there is satisfied such a predetermined condition as in which it is estimated that the air-fuel ratio of exhaust gases upstream of the catalyst is excellently reflected on the air-fuel ratio of exhaust gases at the location midway or downstream of the catalyst, and initial value-updating means for updating and storing an integral term-equivalent value equivalent to the integral term calculated during the feedback control and during a time period during which the predetermined condition is satisfied, as an initial value of the integral term for a following execution of the feedback control, when it is determined by the condition satisfaction-determining means that the predetermined condition is satisfied, and suspending updating of the initial value of the integral term when it is determined by the condition satisfaction-determining means that the predetermined condition is not satisfied, wherein the control input-calculating means uses the stored initial value as the initial value of the integral term at a start of the feedback control.

With the configuration of this air-fuel ratio control system according to the present invention, the air-fuel ratio of exhaust gases is detected by the air-fuel ratio sensor disposed at the location midway or downstream of the catalyst, and when the predetermined feedback control condition is satisfied, the control input including the integral term, for feedback-controlling the output value of the air-fuel ratio sensor such that the output value becomes equal to the target value, is calculated, whereby the feedback-control of the air-fuel ratio is executed.

Further, during the feedback control, it is determined whether or not the predetermined condition is satisfied. Here, the predetermined condition is intended to mean such a condition as in which it is estimated that the air-fuel ratio of exhaust gases upstream of the catalyst is excellently reflected on the air-fuel ratio of exhaust gases at the location midway or downstream of the catalyst. When it is determined that this predetermined condition is satisfied, the integral term-equivalent value equivalent to the integral term calculated during the feedback control and during the time period during which the predetermined condition is satisfied is updated and stored as an initial value of the integral term for the following execution of the feedback control. On the other hand, when it is determined that the predetermined condition is not satisfied, the updating of the initial value is suspended. The initial value updated and stored as described above is used as the initial value of the integral term at the start of the following execution of the feedback control As described hereinabove, only when it is determined during the feedback control that the above-mentioned predetermined condition is satisfied, the integral term-equivalent value equivalent to the integral term calculated during the time period during which the predetermined condition is satisfied is updated as the initial value, and is used as the initial value of the integral term at the start of the following execution of the feedback control. Therefore, only a highly reliable integral term, which is calculated (learned) in the state where the air-fuel ratio of exhaust gases upstream of the catalyst is excellently reflected on the air-fuel ratio of exhaust gases downstream of the catalyst, can be employed as an initial value at the start of the following feedback control. This makes it possible to properly calculate the control input from the outset of the feedback control, thereby making it possible to improve the accuracy of the air-fuel ratio control.

Preferably, the integral term-equivalent value is an integral term calculated immediately before termination of the feedback control.

With the configuration of the preferred embodiment, out of integral terms calculated during the time period during which the air-fuel ratio of exhaust gases upstream of the catalyst is excellently reflected on the air-fuel ratio of exhaust gases at the location midway or downstream of the catalyst, the integral term calculated immediately before interruption of the feedback control is used as the initial value of the integral term at the start of the following feedback control, so that it is possible to employ a highly reliable integral term as the initial value of the integral term at the start of the following feedback control without performing complicated computation processing. This makes it possible to ensure high control accuracy in the air-fuel ratio control while avoiding a rise in computational load.

Preferably, the integral term-equivalent value is an average value of a maximum value and a minimum value of the integral term calculated during the time period during which the predetermined condition is satisfied.

With the configuration of the preferred embodiment, the average value of the maximum value and the minimum value of the integral term calculated during the time period during which the predetermined condition is satisfied, that is, the time period during which the air-fuel ratio of exhaust gases upstream of the catalyst is excellently reflected on the air-fuel ratio of exhaust gases at the location midway or downstream of the catalyst is used as the initial value of the integral term at the start of the following execution of the feedback control. This makes it possible to properly calculate the initial value of the integral term for the following execution of the feedback control during the time period during which the predetermined condition is satisfied, even when the integral term is unstable and is repeatedly inverted in a relatively wide range e.g. due to the fact that the output value of the air-fuel ratio sensor is in a state repeatedly inverted with respect to the target value. As a result, it is possible to ensure high control accuracy in the air-fuel ratio control.

Preferably, the initial value-updating means selects one of an integral term calculated immediately before termination of the feedback control and an average value of a maximum value and a minimum value of the integral term calculated during the time period during which the predetermined condition is satisfied, as the integral term-equivalent value, according to a state of the output value of the air-fuel ratio sensor under the feedback control.

With the configuration of the preferred embodiment, one of the integral term calculated immediately before termination of the feedback control and the average value of the maximum value and the minimum value of the integral term calculated during the time period during which the predetermined condition is satisfied is selected as the integral term-equivalent value, according to a state of the output value of the air-fuel ratio sensor under the feedback control. This makes it possible to ensure high control accuracy in the air-fuel ratio control, by selecting the average value of the maximum value and the minimum value of the integral term as the integral term-equivalent value e.g. in a situation in which the output value of the air-fuel ratio sensor is repeatedly inverted with respect to the target value, causing the integral term to be repeatedly inverted in the relatively wide range. On the other hand, in a situation in which the output value of the air-fuel ratio sensor has converged to the vicinity of the target value, by selecting the integral term calculated immediately before termination of the feedback control as the integral term-equivalent value, it is possible to ensure high control accuracy in the air-fuel ratio control, while avoiding a rise in computational load. As a consequence, it is possible to ensure high control accuracy irrespective of the relationship between the output value of the air-fuel ratio sensor and the target value thereof during the feedback control.

Preferably, the air-fuel ratio control system further comprises an upstream air-fuel ratio sensor disposed at a location upstream of the catalyst, for detecting the air-fuel ratio of exhaust gases, and exhaust gas flow rate-obtaining means for obtaining a flow rate of exhaust gases flowing into the catalyst, and the condition satisfaction-determining means comprises oxygen amount integrated value-calculating means for calculating an integrated value of at least one of a superfluous amount of oxygen and an insufficient amount of oxygen in exhaust gases with respect to a stoichiometric condition, during the feedback control, in a state where the output value of the air-fuel ratio sensor is not inverted with respect to the target value, based on the air-fuel ratio of exhaust gases detected by the upstream air-fuel ratio sensor and the obtained flow rate of exhaust gases, the condition satisfaction-determining means determining that the predetermined condition is satisfied, when the calculated integrated value of the amount of oxygen has become not smaller than a predetermined amount.

The air-fuel ratio of exhaust gases downstream of the catalyst changes according to an oxygen storage of the catalyst, and hence is not necessarily equal to the air-fuel ratio of exhaust gases upstream of the catalyst. For example, in a case where a fuel cut operation for interrupting fuel supply to the engine is executed for a relatively long time period, a large amount of oxygen is stored in the catalyst. When exhaust gases having a rich air-fuel ratio flow into the catalyst that stores the large amount of oxygen, oxidation reaction is performed by oxygen released from the catalyst, whereby the air-fuel ratio of exhaust gases downstream of the catalyst exhibits a leaner value than the air-fuel ratio of exhaust gases upstream of the catalyst. This state continues until consumption of oxygen in the catalyst is completed. Therefore, the integral term obtained by the feedback control performed in such a state has low reliability since it is calculated based on the air-fuel ratio of exhaust gases downstream of the catalyst which deviates from the air-fuel ratio of exhaust gases upstream of the catalyst.

Inversely to the above, for example, in a case where catalyst reduction control for supplying exhaust gases having a rich air-fuel ratio to the catalyst so as to reduce the amount of NOx emission is performed for a relatively long time period after the fuel cut operation, the amount of oxygen stored in the catalyst becomes very small. When exhaust gases having a lean air-fuel ratio flow into the catalyst that stores the very small amount of oxygen, superfluous oxygen in the exhaust gases is stored in the catalyst, so that the air-fuel ratio of exhaust gases downstream of the catalyst exhibits a richer value than the air-fuel ratio of exhaust gases upstream of the catalyst. This state continues until the catalyst is saturated with oxygen. Therefore, the integral term obtained by the feedback control performed in such a state also has low reliability.

In view of this, with the configuration of the above-described preferred embodiment, during the feedback control, the integrated value of at least one of the superfluous amount of oxygen and the insufficient amount of oxygen in exhaust gases compared with the stoichiometric condition is calculated, in the state where the output value of the air-fuel ratio sensor is not inverted with respect to the target value, based on the air-fuel ratio of exhaust gases detected by the upstream air-fuel ratio sensor and the flow rate of exhaust gases. Then, when the calculated integrated value of the amount of oxygen has become not smaller than the predetermined amount, that is, when the exhaust gases having the lean air-fuel ratio continue to flow into the catalyst until it is regarded that the catalyst is saturated with oxygen stored therein, or when the exhaust gases having the rich air-fuel ratio continue to flow into the catalyst until it is regarded that there remains very little oxygen in the catalyst, it is determined that the predetermined condition is satisfied. Therefore, by setting the integral term calculated in the thus determined state as an initial value to update the same, only a highly reliable integral term, which is calculated in the state where the air-fuel ratio of exhaust gases upstream of the catalyst is excellently reflected on the air-fuel ratio of exhaust gases downstream of the catalyst, can be used as the initial value of the integral term at the start of the following execution of the feedback control. This makes it possible to improve the accuracy of the air-fuel ratio control.

Preferably, the condition satisfaction-determining means comprises inversion count-calculating means for calculating a number of times of inversion of the output value of the air-fuel ratio sensor with respect to the target value during the feedback control, and the condition satisfaction-determining means determines that the predetermined condition is satisfied when the calculated number of times of inversion becomes not smaller than a predetermined number.

As described hereinabove, in the present invention, the feedback-control of the air-fuel ratio is executed such that the output value of the air-fuel ratio sensor becomes equal to the target value, and hence if the output value is richer than the target value, the air-fuel ratio of exhaust gases upstream of the catalyst is controlled to a leaner value for correction thereof, and further along with the control of the air-fuel ratio to the leaner value, if the output value of the air-fuel ratio sensor is inverted to a leaner side with respect to the target value, the air-fuel ratio of exhaust gases upstream of the catalyst is controlled to a richer value for correction thereof. Therefore, the fact that the inversion of the output value of the air-fuel ratio is inverted with respect to the target value indicates that the air-fuel ratio of exhaust gases upstream of the catalyst is excellently reflected on the air-fuel ratio of exhaust gases downstream of the catalyst.

From the above-described viewpoint, with the configuration of the above-described preferred embodiment, during the feedback control, the number of times of inversion of the output value of the air-fuel ratio sensor with respect to the target value is calculated, and when the calculated number of times of inversion becomes not smaller than the predetermined number, it is determined that the predetermined condition is satisfied. Therefore, by setting the integral term calculated in the thus determined state as an initial value to update the same, only a highly reliable integral term, which is calculated in the state where the air-fuel ratio of exhaust gases upstream of the catalyst is excellently reflected on the air-fuel ratio of exhaust gases downstream of the catalyst, can be used as the initial value of the integral term at the start of the following execution of the feedback control. This makes it possible to improve the accuracy of the air-fuel ratio control.

Preferably, the air-fuel ratio control system further comprises an upstream air-fuel ratio sensor disposed at a location upstream of the catalyst, for detecting the air-fuel ratio of exhaust gases, and the control input-calculating means calculates a target air-fuel ratio as the control input by sliding mode control such that the output value of the air-fuel ratio sensor becomes equal to the target value, the air-fuel ratio control system controlling an amount of fuel supplied to the engine such that the air-fuel ratio of exhaust gases detected by the upstream air-fuel ratio sensor becomes equal to the calculated target air-fuel ratio, wherein the integral term of the control input is an adaptive law input in the sliding mode control.

With the configuration of the preferred embodiment, the upstream air-fuel ratio sensor is disposed at a location upstream of the catalyst. Further, the target air-fuel ratio as the control input is calculated by the sliding mode control such that the output value of the air-fuel ratio sensor becomes equal to the target value. Therefore, the target air-fuel ratio can be properly calculated using the air-fuel ratio of exhaust gases detected by the air-fuel ratio sensor, by the sliding mode control having characteristics that the output value can be caused to quickly converge to the target value with little influence of a disturbance.

Further, the amount of fuel supplied to the engine is controlled using the target air-fuel ratio calculated as described above, such that the air-fuel ratio of exhaust gases detected by the upstream air-fuel ratio sensor becomes equal to the calculated target air-fuel ratio. This makes it possible to further improve the accuracy of the air-fuel ratio control. Further, the integral term of the control input corresponds to the adaptive law input in the sliding mode control. Therefore, it is possible to similarly obtain the aforementioned advantageous effects when the adaptive law input is initialized at the start of the sliding mode control.

The above and other objects, features, and advantages of the present invention will become more apparent from the following detailed description taken in conjunction with the accompanying drawings.

DETAILED DESCRIPTION OF PREFERRED EMBODIMENTS

Figure 1:
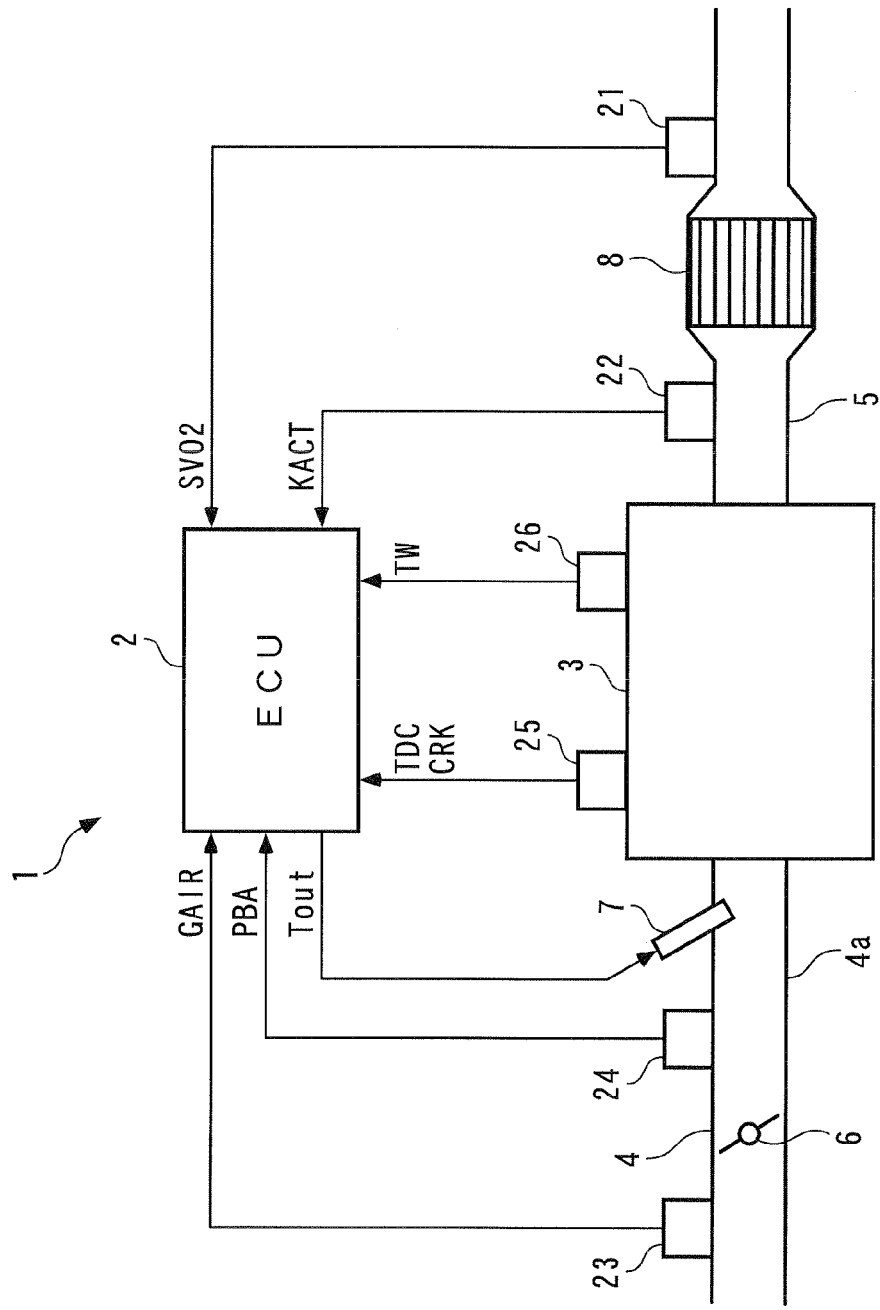
FIG. 1 is a diagram schematically showing an air-fuel ratio control system according to a first embodiment of the present invention together with an internal combustion engine.

The invention will now be described in detail with reference to drawings showing preferred embodiments thereof. As shown in FIG. 1, an air-fuel ratio control system 1 for an internal combustion engine, according to a first embodiment of the present invention, is provided with an ECU 2. The ECU 2 carries out various control processes including air-fuel ratio control for controlling the air-fuel ratio of the internal combustion engine (hereinafter simply referred to as the "engine") 3. The engine 3 is a diesel engine that has e.g. four cylinders, and is installed on a vehicle, not shown. An intake pipe 4 of the engine 3 is provided with a throttle valve 6, and an intake manifold 4a downstream of the throttle valve 6 is provided with a fuel injection valve (hereinafter referred to as the "injector") 7. The valve-opening time period of the injector 7 and the opening and closing timings thereof are controlled by the ECU 2, whereby a fuel injection amount Tout and fuel injection timing of fuel are controlled.

An exhaust pipe 5 of the engine 3 has a catalyst 8 provided at a downstream location thereof. The catalyst 8 is implemented by a three-way catalyst, and purifies CO, HC, and NOx in exhaust gases by oxidation-reduction reaction. Further, the three-way catalyst has an oxygen storage capacity for storing oxygen.

An oxygen concentration sensor (hereinafter referred to as the "O2 sensor") 21 is disposed in the exhaust pipe 5 at a location downstream of the catalyst 8. The O2 sensor 21 detects the concentration of oxygen in exhaust gases on the downstream side of the catalyst 8, and delivers a signal indicative of the detected oxygen concentration to the ECU 2. Further, the O2 sensor 21 is of a so-called inversion type having an output characteristic that its output drastically changes across a value of the air-fuel ratio of exhaust gases which corresponds to a stoichiometric air-fuel ratio of an air-fuel mixture. A detection value (hereinafter referred to as the "O2 output value") SVO2 detected by the O2 sensor 21 is larger as the exhaust gas air-fuel ratio is richer. The term "exhaust gas air-fuel ratio" is intended to mean a weight ratio of air and combustible gas in exhaust gases.

Further, a LAF sensor 22 is disposed in the exhaust pipe 5 at a location upstream of the catalyst 8. The LAF sensor 22 linearly detects the concentration of oxygen in exhaust gases, over a broad range of the exhaust gas air-fuel ratio, and delivers a signal indicative of the exhaust gas air-fuel ratio (hereinafter referred as the "actual air-fuel ratio") KACT, which is dependent on the detected oxygen concentration, to the ECU 2. This air-fuel ratio KACT and a target air-fuel ratio KCMD, referred to hereinafter, are in equivalent ratios.

Further, an air flow meter 23 and an intake pressure sensor 24 are arranged in the intake pipe 4 at respective locations upstream and downstream of the throttle valve 6. The air flow meter 23 detects a mass GAIR of air flowing through the intake pipe 4 (hereinafter referred to as the "air mass GAIR"), and delivers a signal indicative of the detected air mass GAIR to the ECU 2. The intake pressure sensor 24 detects pressure PBA of intake air (hereinafter referred to as the "intake pressure PBA"), and delivers a signal indicative of the detected intake pressure PBA to the ECU 2. Further, a coolant temperature sensor 26 detects a temperature TW of engine coolant of the engine 3 (hereinafter referred to as the "engine coolant temperature TW"), and delivers a signal indicative of the detected engine coolant temperature TW to the ECU 2.

A crank angle sensor 25 is mounted on the crankshaft, not shown, of the engine 3. The crank angle sensor 25 delivers a CRK signal and a TDC signal, which are both pulse signals, to the ECU 2 along with rotation of the crankshaft.

Each pulse of the CRK signal is generated whenever the crankshaft rotates through a predetermined crank angle (e.g. 30°). The ECU 2 calculates a rotational speed NE of the engine 3 (hereinafter referred to as "the engine speed NE") based on the CRK signal. Further, the TDC signal indicates that a piston (not shown) of one of the cylinders (not shown) of the engine 3 is at a predetermined crank angle position in the vicinity of TDC (top dead center) at the start of the intake stroke thereof. In the case of the four-cylinder engine of the illustrated example, the TDC signal is delivered whenever the crankshaft rotates through 180°.

The ECU 2 is implemented by a microcomputer comprising a CPU, a RAM, a ROM, and an I/O interface (none of which are shown). Based on the detection signals from the above-mentioned sensors 21 to 26, the CPU performs various computing operations for the air-fuel ratio control and the like according to control programs and the like stored in the ROM. In the present embodiment, the ECU 2 corresponds to control input-calculating means, condition satisfaction-determining means, initial value-updating means, oxygen amount integrated value-calculating means, and inversion count-calculating means.

Next, an air-fuel ratio control process executed by the ECU 2 will be described with reference to FIGS. 2 to 7. Note that values calculated in the following control process are assumed to be all stored in the RAM. The air-fuel ratio control process controls the air-fuel ratio by calculating the target air-fuel ratio KCMD such that the O2 output value SVO2 of the O2 sensor 21 becomes equal to a value dependent on operating conditions of the engine 3, and calculating the fuel injection amount Tout such that the actual air-fuel ratio KACT detected by the LAF sensor 22 becomes equal to the target air-fuel ratio KCMD.

Figure 2:
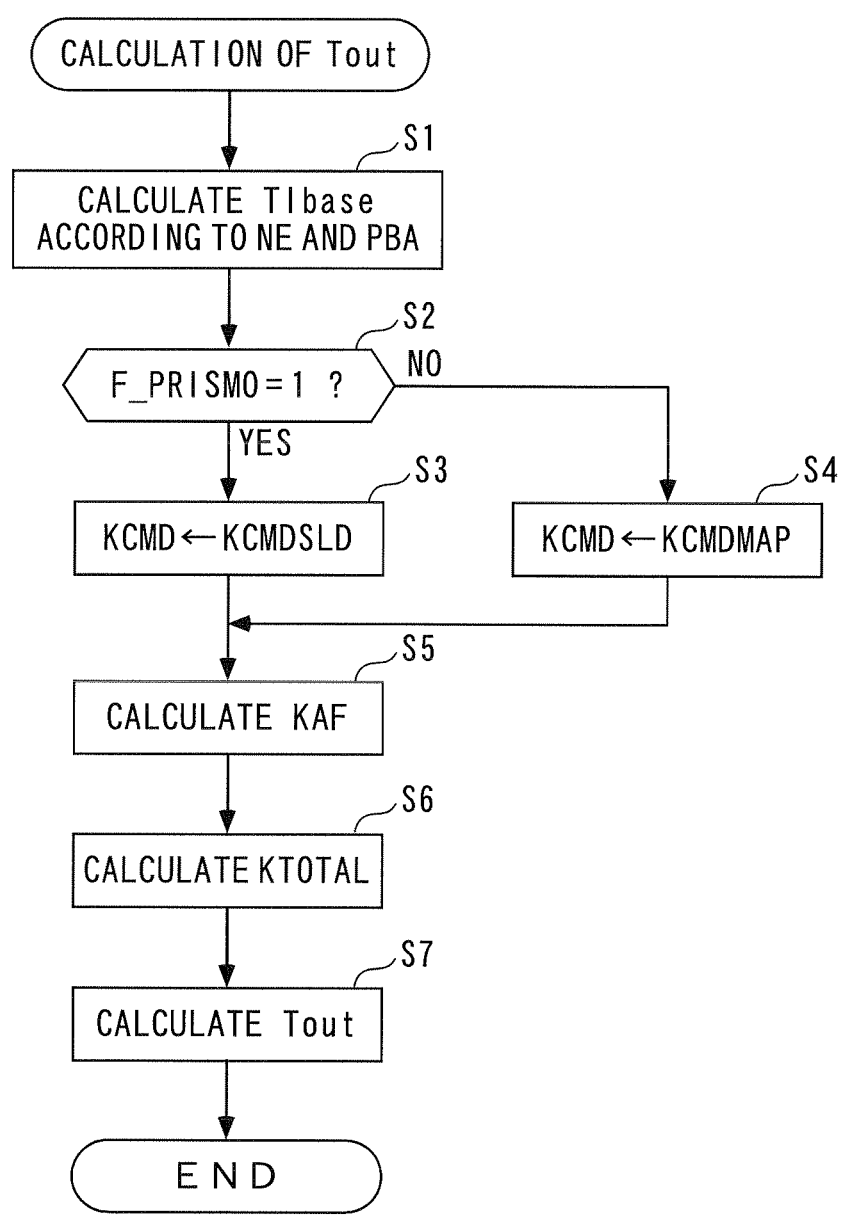
FIG. 2 is a flowchart of a process for calculating a fuel injection amount.

FIG. 2 shows a process for calculating the fuel injection amount Tout. The present process is carried out in synchronism with generation of each pulse of the TDC signal. In the present process, first, in a step 1 (shown as S1 in abbreviated form; the following steps are also shown in abbreviated form), a basic fuel amount TIbase is calculated by searching a predetermined map (not shown) according to the engine speed NE and the intake pressure PBA. The basic fuel amount TIbase is a basic value of the fuel injection amount Tout. In this map, the basic fuel amount TIbase is set to a larger value as the engine speed NE is higher, and the intake pressure PBA is higher. The basic fuel amount TIbase may be calculated according to the air mass GAIR detected by the air flow sensor 23.

Next, in a step 2, it is determined whether or not a post-CAT feedback flag F_PRISMO is equal to 1. The post-CAT feedback flag F_PRISMO is set to 1 in a setting process, not shown, when predetermined conditions for executing post-CAT feedback control are satisfied, and is otherwise set to 0. The post-CAT feedback control is for calculating a post-CAT feedback control value KCMDSLD with a sliding mode control algorithm, described hereinafter, and detailed description thereof will be given hereinafter.

If the answer to the question of the step 2 is affirmative (YES), it is determined that the post-CAT feedback control should be executed, and the process proceeds to a step 3, wherein the target air-fuel ratio KCMD is set to the post-CAT feedback control value KCMDSLD stored in the RAM.

On the other hand, if the answer to the question of the step 2 is negative (NO), it is determined that the post-CAT feedback control should be stopped, and the process proceeds to a step 4, wherein the target air-fuel ratio KCMD is set to a feedforward control value KCMDMAP stored in the RAM. The feedforward control value KCMDMAP is calculated in a calculation process, not shown, by a map search method or a predetermined value selection method, according to operating conditions of the engine 3.

In a step 5 following the step 3 or 4, an air-fuel ratio correction coefficient KAF is calculated by PID feedback control such that the actual air-fuel ratio KACT detected by the LAF sensor 22 converges to the target air-fuel ratio KCMD. The air-fuel ratio correction coefficient KAF may be calculated using e.g. an STR (self tuning regulator). Next, in a step 6, a total correction coefficient KTOTAL is calculated. The total correction coefficient KTOTAL is calculated by multiplying various correction coefficients including e.g. a coolant temperature-dependent correction coefficient calculated according to the engine coolant temperature TW, by each other.

Next, in a step 7, the fuel injection amount Tout is calculated using the basic fuel amount TIbase, the target air-fuel ratio KCMD, the air-fuel ratio correction coefficient KAF, and the total correction coefficient KTOTAL, which are calculated in the respective steps 1 and 3 to 6, by the following equation (1):

$$Tout = TIbase \cdot KCMD \cdot KAF \cdot KTOTAL \quad (1)$$

followed by terminating the present process.

Hereinafter, a process for calculating the above-mentioned post-CAT feedback control value KCMDSLD will be described with reference to FIG. 3. As will be described hereinafter, this process calculates the post-CAT feedback control value KCMDSLD with the sliding mode control algorithm such that the O2 output value SVO2 of the O2 sensor 21 becomes equal to a target value SVO2CMD, when the conditions for executing the post-CAT feedback control are satisfied, and is executed whenever a predetermined time period (e.g. 50 ms) elapses. In the present embodiment, to reduce the amount of NOx emission, the target value SVO2CMD is set to a value slightly larger, i.e. slightly richer, than a value corresponding to the stoichiometric air-fuel ratio.

In the present process, first, in a step 11, an adaptive law input UADP for sliding mode control is calculated. The process for calculating the adaptive law input UADP will be described hereinafter.

Next, in a step 12, a reaching law input URCH is calculated using a predetermined reaching law gain KRCH and a switching function σ (k), referred to hereinafter, by the following equation (2):

$$URCH = KRCH \cdot \sigma(k) \quad (2)$$

and a value obtained by this calculation is subjected to a limiting process, whereby the reaching law input URCH is calculated as a final value thereof.

Then, in a step 13, a correction value TSL is calculated using the calculated adaptive law input UADP and reaching law input URCH, by the following equation (3):

$$USL = UADP + URCH \quad (3)$$

Next, in a step 14, the target air-fuel ratio KCMD is calculated using a predetermined air-fuel ratio reference value FLAFBASE and the calculated correction value USL, by the following equation (4):

$$KCMD = FLAFBASE + USL \quad (4)$$

followed by terminating the present process.

Figure 3:
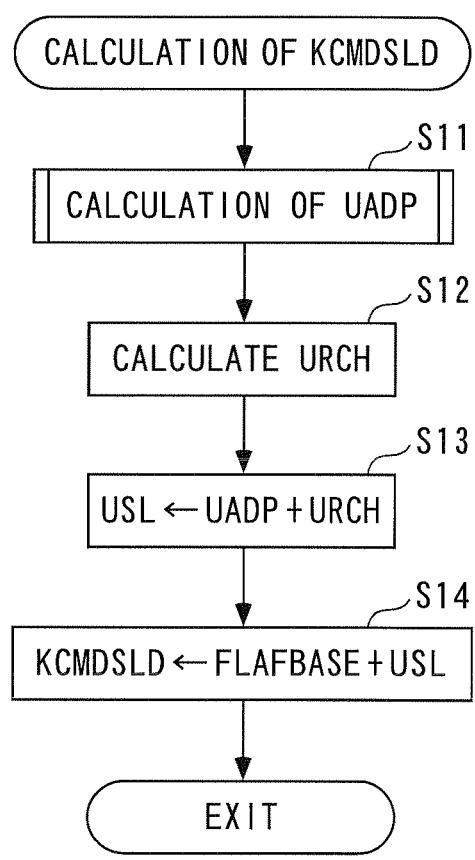
FIG. 3 is a flowchart of a subroutine for a process for calculating a post-CAT feedback control value of a target air-fuel ratio.
Figure 4:
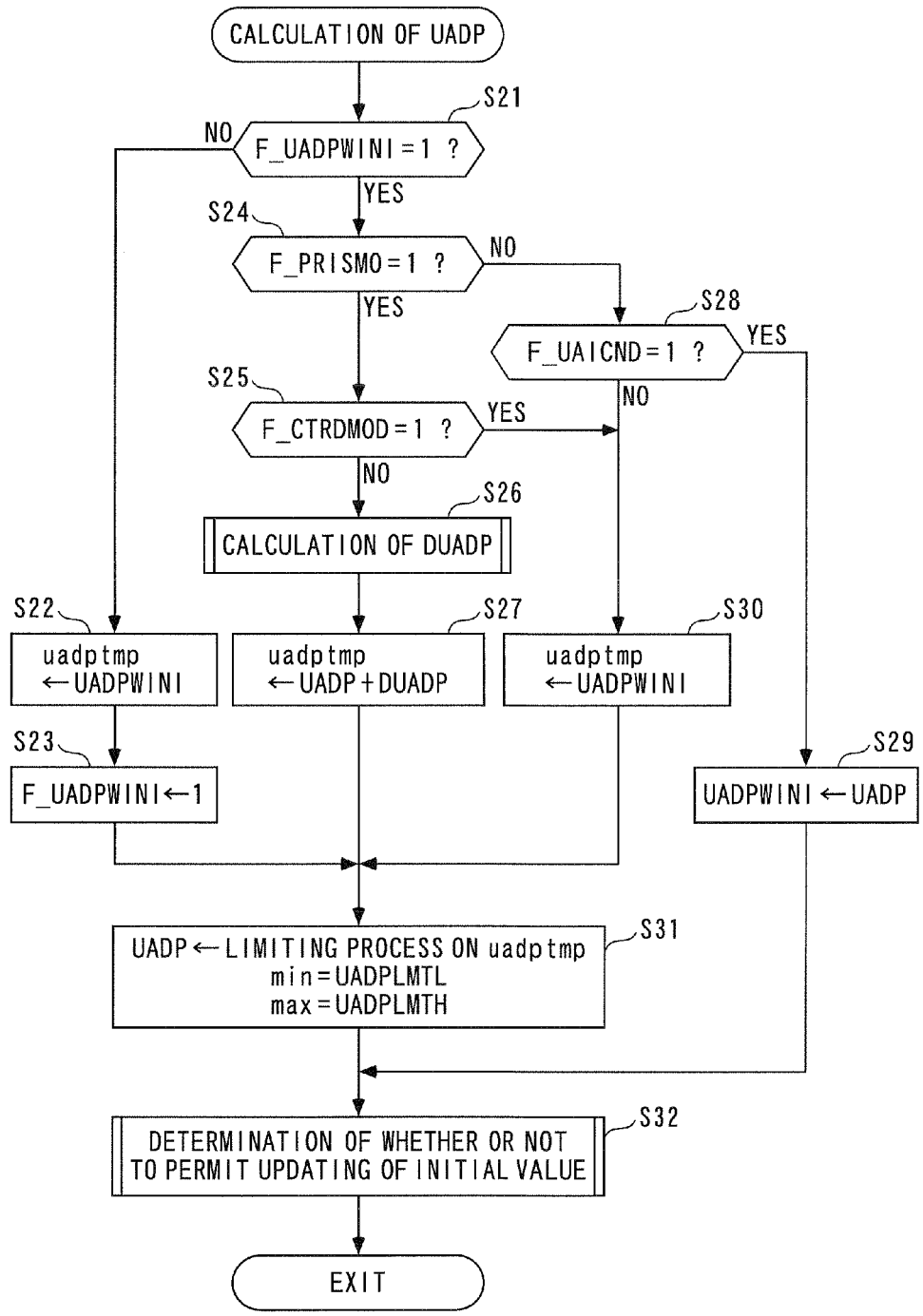
FIG. 4 is a flowchart of a subroutine for a process for calculating an adaptive law input.

FIG. 4 shows the process for calculating the adaptive law input UADP, which is executed in the step 11 in FIG. 3. In the present process, first, in a step 21, it is determined whether or not an initialized flag F_UADPWINI of the adaptive law input UADP is equal to 1.

If the answer to this question is negative (NO), i.e. if the initialization of the adaptive law input UADP has not been performed yet, an initial value UADPWINI of the adaptive law input UADP set and stored as described hereinafter is set as a provisional value uadptmp of the adaptive law input (step 22), whereby the adaptive law input UADP is initialized. Then, the initialized flag F_UADPWINI is set to 1 (step 23), and then the process proceeds to a step 31, referred to hereinafter.

If the answer to the question of the step 21 is affirmative (YES), i.e. if the initialization of the adaptive law input UADP has been performed, it is determined whether or not the post-CAT feedback flag F_PRISMO is equal to 1 (step 24). If the answer to this question is affirmative (YES), i.e. if the post-CAT feedback control is being executed, it is determined whether or not a catalyst reduction mode flag F_CTRDMOD is equal to 1 (step 25). The catalyst reduction mode flag F_CTRDMOD is set to 1 when a catalyst reduction mode is being executed. In the catalyst reduction mode, e.g. after a fuel cut operation which interrupts fuel supply to the engine 3, exhaust gases supplied to the catalyst 8 are forcibly enriched for placing the catalyst 8 in a reducing state so as to reduce the amount of NOx emission.

If the answer to the question of the step 25 is negative (NO), i.e. if the post-CAT feedback control is being executed but at the same time the catalyst reduction mode is not being executed, a present (this-time) component DUADP of the adaptive law input UADP is calculated (step 26).

Figure 5:
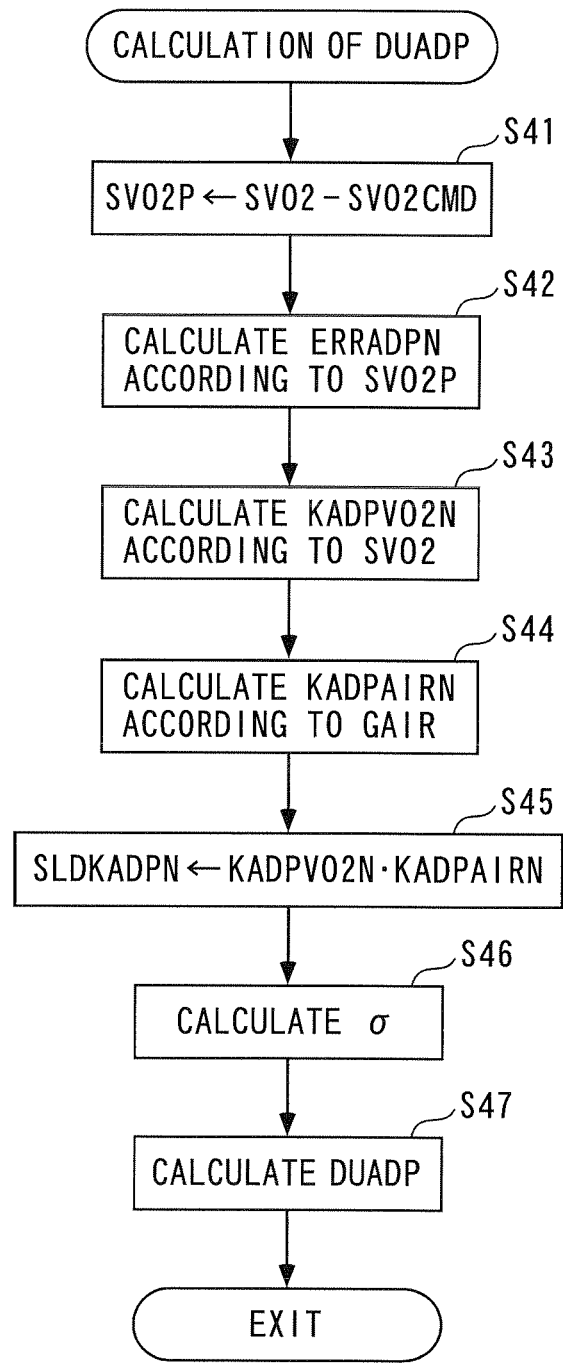
FIG. 5 is a flowchart of a subroutine for a process for calculating a this-time component of the adaptive law input.

FIG. 5 is a flowchart of a subroutine for a process for calculating the present component DUADP of the adaptive law input UADP. In the present process, first, in a step 41, the difference between the O2 output value SVO2 and the target value SVO2CMD is calculated as an output difference SVO2P, and in a step 42, a converted value ERRADPN is calculated according to the calculated output difference SVO2P. Then, in a step 43, a first gain KADPVO2N is calculated by searching a predetermined map, not shown, according to the O2 output value SVO2.

Next, in a step 44, a second gain KADPAIRN is calculated by searching a predetermined map, not shown, according to the air mass GAIR, and in a step 45, a total gain SLDKADPN is calculated by multiplying the first gain KADPVO2N by the calculated second gain KADPAIRN.

Then, in a step 46, the switching function σ(k) is calculated using the present value ERRADPN(k) and the immediately preceding value ERRADPN(k−1) of the converted value and a predetermined response-specifying parameter s (−1<s<0), by the following equation (5):

$$\sigma(k) = ERRADPN(k) + s \cdot ERRADPN(k-1) \quad (5)$$

Next, in a step 47, the present component DUADP of the adaptive law input UADP is calculated using the calculated total gain SLDKADPN and switching function σ(k), by the following equation (6):

$$DUADP = SLDKADPN \cdot \sigma(k) \quad (6)$$

followed by terminating the present process.

Referring again to FIG. 4, in a step 27 following the step 26, the provisional value uadptmp of the adaptive law input is calculated by adding the present component DUADP calculated as described above to the adaptive law input UADP calculated up to the time, and then the process proceeds to the step 31, referred to hereinafter.

On the other hand, if the answer to the question of the step 24 is negative (NO), i.e. if the post-CAT feedback control has been interrupted, it is determined whether or not an initial value update permission flag F_UAICND is equal to 1 (step 28). The initial value update permission flag F_UAICND is set to 1 in a determination process in a step 32, referred to hereinafter, when the updating of the initial value UADP- WINI of the adaptive law input UADP is permitted during execution of the post-CAT feedback control.

If the answer to the question of the step 28 is affirmative (YES), i.e. if the updating of the initial value UADPWINI of the adaptive law input UADP has been permitted, an adaptive law input UADP at the time, that is, an adaptive law input UADP calculated immediately before the interruption of the post-CAT feedback control is set as the initial value UADP-WINI (step 29), whereby the initial value UADPWINI is updated. Further, as described hereinafter, the initial value update permission flag F_UAICND is reset to 0 immediately after it is used for the determination in the step 28, so that the updating of the initial value UADPWINI in the step 29 is performed only once immediately after the interruption of the post-CAT feedback control.

On the other hand, if the answer to the question of the step 28 is negative (NO), i.e. if F_UAICND=0 holds, similarly to the step 22, the initial value UADPWINI is set as the provisional value uadptmp of the adaptive law input (step 30), and then the process proceeding to the step 31. Further, if the answer to the question of the step 25 is affirmative (YES), i.e. if the catalyst reduction mode is being executed, the step 30 is executed without calculating the adaptive law input UADP.

In the step 31 following the step 23, 27 or 30, a limiting process is performed on the calculated provisional value uadptmp of the adaptive law input, to calculate the adaptive law input UADP as a final value thereof. Specifically, when the provisional value uadptmp of the adaptive law input is smaller than a predetermined lower limit value UADPLMTL, the adaptive law input UADP is set to the lower limit value UADPLMTL, whereas when the provisional value uadptmp is larger than a predetermined upper limit value UADPLMTH, the adaptive law input UADP is set to the upper limit value UADPLMTH. In a case other than these, the provisional value uadptmp of the adaptive law input is directly set as the adaptive law input UADP.

Figure 6:
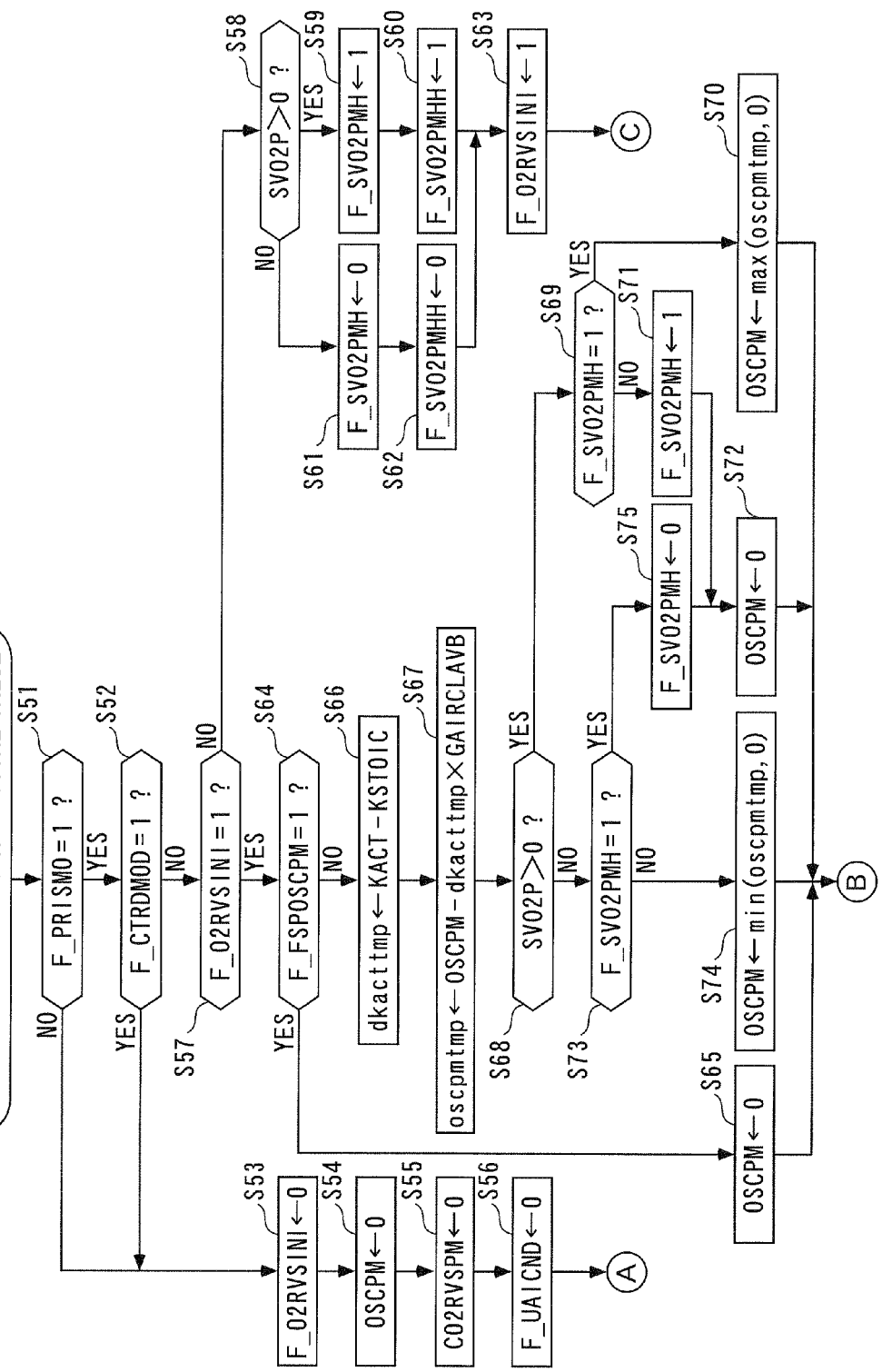
FIG. 6 is a flowchart of a subroutine for an initial value update permission-determining process for determining whether or not to permit the updating of an initial value of the adaptive law input.
Figure 7:
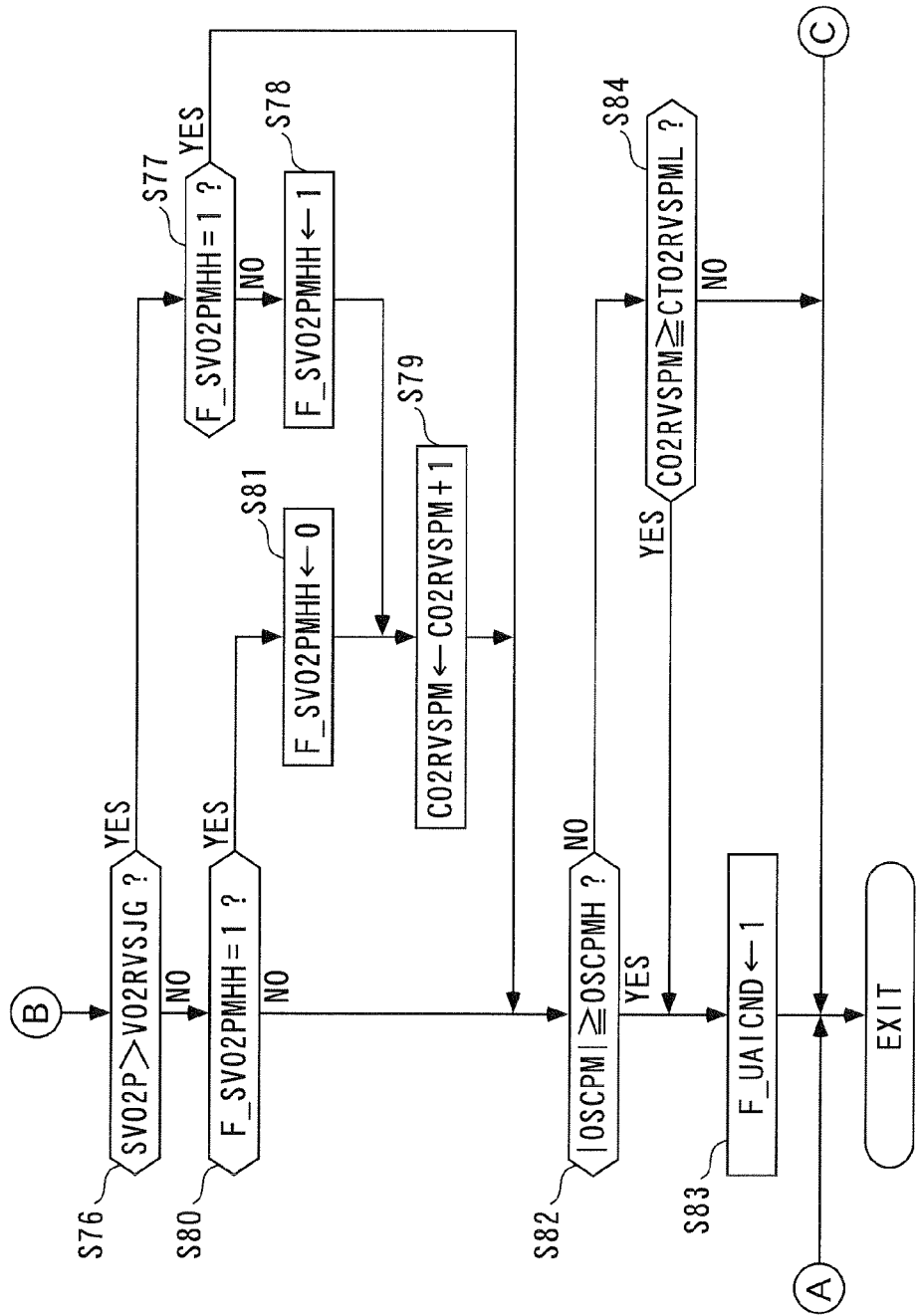
FIG. 7 is a continuation of FIG. 6.

After execution of the step 29, or after execution of the limiting process in the step 31, an update permission-determining process for determining whether or not to permit the updating of the initial value UADPWINI is executed (step 32). FIGS. 6 and 7 show a flowchart of a subroutine for the update permission-determining process. In the present process, first, it is determined whether or not the post-CAT feedback flag F_PRISMO is equal to 1 (step 51), and then it is determined whether or not the catalyst reduction mode flag F_CTRDMOD is equal to 1 (step 52).

If the answer to the question of the step 51 is negative (NO), which means that the post-CAT feedback control has been interrupted, or if the answer to the question of the step 52 is affirmative (YES), which means that the catalyst reduction mode is being executed, i.e. if the adaptive law input UADP is not calculated, a richer-side inversion initial setting flag F_O2RVSINI, an OSC (oxygen storage capacity) amount OSCPM, and an inversion counter value CO2RVSPM, which are referred to hereinafter, are reset to 0, in respective steps 53 to 55. Further, the initial value update permission flag F_UAICND is reset to 0 (step 56), followed by terminating the present process.

If the answer to the question of the step 51 is affirmative (YES) but at the same time the answer to the question of the step 52 is negative (NO), i.e. if the post-CAT feedback control is being executed but at the same time the catalyst reduction mode is not being executed, it is determined whether or not the initial setting flag F_O2RVSINI is equal to 1 (step 57). By execution of the step 53, the answer to the question of the step 57 becomes negative (NO) in a first-time loop, and hence in this case, the process proceeds to a step 58, wherein it is determined whether or not the output difference SVO2P, which is the difference between the O2 output value SVO2 and the target value SVO2CMD, is larger than 0.

If the answer to this question is affirmative (YES), i.e. if the O2 output value SVO2 is richer than the target value SVO2CMD, a first richer-side inversion flag F_SVO2PMH and a second richer-side inversion flag F_SVO2PMHH are set to 1 in respective steps 59 and 60.

On the other hand, if the answer to the question of the step 58 is negative (NO), i.e. if the O2 output value SVO2 is not richer than the target value SVO2CMD, the first and second richer-side inversion flags F_SVO2PMH and F_SVO2PMHH are set to 0 in respective steps 61 and 62. After execution of the step 60 or 62, the initial setting flag F_O2RVSINI is set to 1 (step 63), followed by terminating the present process.

The answer to the question of the step 57 becomes affirmative (YES) after execution of the above step 63, and therefore in this case, the OSC amount OSCPM is calculated in steps 64 to 75. The OSC amount OSCPM corresponds to an integrated value of the superfluous or insufficient amount of oxygen in exhaust gases with respect to a stoichiometric condition thereof, in a state where the O2 output value SVO2 is not inverted with respect to the target value SVO2CMD during the post-CAT feedback control.

First, in the step 64, it is determined whether or not a failsafe flag F_FSPOSCPM is equal to 1. If the answer to this question is affirmative (YES), i.e. if failsafe control is being executed, the OSC amount OSCPM is reset to 0 (step 65), and then the process proceeds to a step 76.

If the answer to the question of the step 64 is negative (NO), the difference between the actual air-fuel ratio KACT detected by the LAF sensor 22 and a reference air-fuel ratio KSTOIC (=KACT−KSTOIC) is calculated as an air-fuel ratio difference dkacttmp in the present cycle (step 66).

The above-mentioned reference air-fuel ratio KSTOIC corresponds to the stoichiometric air-fuel ratio, and is calculated using the initial value UADPWINI of the adaptive law input UADP, etc. Therefore, the air-fuel ratio difference dkacttmp corresponds to an amount of deviation of the actual air-fuel ratio KACT in the present cycle from the stoichiometric air-fuel ratio. Further, the actual air-fuel ratio KACT and the like are represented by equivalent ratios, and hence a positive value of the air-fuel ratio difference dkacttmp represents a state where the air-fuel ratio of exhaust gases is deviated toward the richer side, i.e. oxygen in exhaust gases is insufficient compared with the stoichiometric condition. Inversely, a negative value of the air-fuel ratio difference dkacttmp represents a state where the air-fuel ratio of exhaust gases is deviated toward the leaner side, i.e. oxygen in exhaust gases is superfluous compared with the stoichiometric condition.

In the step 67 following the step 66, a provisional value oscpmtmp of the OSC amount OSCPM is calculated by subtracting a value, which is obtained by multiplying the calculated air-fuel ratio difference dkacttmp by an exhaust gas flow rate GAIRCLAVB in the present cycle, from the OSC amount OSCPM having been calculated. The exhaust gas flow rate GAIRCLAVB is calculated by the ECU 2 based on the air mass GAIR.

Next, it is determined whether or not the output difference SVO2P is larger than 0 (step 68). If the answer to this question is affirmative (YES), it is determined whether or not the first richer-side inversion flag F_SVO2PMH is equal to 1 (step 69). If the answer to this question is affirmative (YES), i.e. if a state where the O2 output value SVO2 is richer than the target value SVO2CMD continues, a larger one of the provisional value oscpmtmp of the OSC amount OSCPM calculated in the step 67 and 0 is calculated as the OSC amount OSCPM (step 70), and then the process proceeds to the step 76, referred to hereinafter. The provisional value oscpmtmp of the OSC amount OSCPM is thus subjected to a limiting process to thereby hold the OSC amount OSCPM at a value not smaller than 0, because delay of detection by the LAF sensor 22 is taken into account to prevent an erroneous calculation of the OSC amount OSCPM due to the detection delay.

If the answer to the question of the step 69 is negative (NO), i.e. if the O2 output value SVO2 has changed from the leaner side into the richer side with respect to the target value SVO2CMD, the first richer-side inversion flag F_SVO2PMH is set to 1 (step 71), and the OSC amount OSCPM is reset to 0 (step 72), and then the process proceeds to the step 76.

On the other hand, if the answer to the question of the step 68 is negative (NO), i.e. if the output difference SVO2P≤0 holds, similarly to the step 69, it is determined whether or not the first richer-side inversion flag F_SVO2PMH is equal to 1 (step 73). If the answer to this question is negative (NO), i.e. if a state where the O2 output value SVO2 is leaner than the target value SVO2CMD continues, a smaller one of the provisional value oscpmtmp of the OSC amount OSCPM and 0 is calculated as the OSC amount OSCPM (step 74), and then the process proceeds to the step 76. This limiting process as well is performed so as to prevent an erroneous calculation of the OSC amount OSCPM due to the delay of detection by the LAF sensor 22.

If the answer to the question of the step 73 is affirmative (YES), i.e. if the O2 output value SVO2 has changed from the richer side into the leaner side with respect to the target value SVO2CMD, the first richer-side inversion flag F_SVO2PMH is set to 0 (step 75). Then, the process proceeds to the step 72 to reset the OSC amount OSCPM to 0, and then proceeds to the step 76.

Next, in the step 76 and steps 77 to 81, the number of times of inversion of the O2 output value SVO2 with respect to the target value SVO2CMD is calculated. First in the step 76, it is determined whether or not the output difference SVO2P is larger than a predetermined value VO2RVSJG for use in determination of the inversion. The predetermined value VO2RVSJG is obtained by adding a predetermined hysteresis to 0. If the answer to the question of the step 76 is affirmative (YES), it is determined whether or not the second richer-side inversion flag F_SVO2PMHH is equal to 1 (step 77). If the answer to this question is affirmative (YES), i.e. if the state where the O2 output value SVO2 is richer than the target value SVO2CMD continues, the process proceeds to a step 82.

On the other hand, if the answer to the question of the step 77 is negative (NO), i.e. if the O2 output value SVO2 is inverted from the leaner side to the richer side with respect to the target value SVO2CMD, the second richer-side inversion flag F_SVO2PMHH is set to 1 (step 78), and the inversion counter value CO2RVSPM is incremented (step 79), and then the process proceeds to the step 82.

If the answer to the question of the step 76 is negative (NO), similarly to the step 77, it is determined whether or not the second richer-side inversion flag F_SVO2PMHH is equal to 1 (step 80). If the answer to this question is negative (NO), i.e. if the state where the O2 output value SVO2 is leaner than the target value SVO2CMD continues, the process proceeds to the step 82.

On the other hand, if the answer to the question of the step 80 is affirmative (YES), i.e. if the O2 output value SVO2 has inverted from the richer side to the leaner side with respect to the target value SVO2CMD, the second richer-side inversion flag F_SVO2PMHH is set to 0 (step 81). Then, the process proceeds to the step 79, wherein the inversion counter value CO2RVSPM is incremented. As is clear from the above calculation method, the inversion counter value CO2RVSPM represents the number of times of inversion of the O2 output value SVO2 with respect to the target value SVO2CMD between the leaner side and the richer side during the post-CAT feedback control.

Next, in the step 82, it is determined whether or not the absolute value |OSCPM| of the OSC amount OSCPM calculated in the step 65, 70, 72 or 74 is not smaller than a predetermined amount OSCPMH. The predetermined amount OSCPMH corresponds to the maximum amount of oxygen that can be stored in the catalyst 8 in a fresh state.

If the answer to the question of the step 82 is affirmative (YES), i.e. if |OSCPM|≥OSCPMH holds, that is, if it is estimated that during the post-CAT feedback control, the integrated value of the superfluous amount of oxygen in exhaust gases compared with the stoichiometric condition has become not smaller than the maximum amount of oxygen that can be stored in the catalyst 8, and hence the catalyst 8 is saturated with oxygen, or if it is estimated that during the post-CAT feedback control, the integrated value of the insufficient amount of oxygen in exhaust gases compared with the stoichiometric condition has become not smaller than the maximum amount of oxygen that can be stored in the catalyst 8, and hence there is very little oxygen in the catalyst 8, it is determined that there is satisfied a predetermined condition for excellently reflecting the air-fuel ratio of exhaust gases upstream of the catalyst 8 on the air-fuel ratio of exhaust gases downstream of the catalyst 8, so that the initial value update permission flag F_UAICND is set to 1 (step 83), followed by terminating the present process.

If the answer to the question of the step 82 is negative (NO), it is determined whether or not the inversion counter value CO2RVSPM calculated in the step 79 is not smaller than a predetermined count CTO2RVSPML (e.g. 2) (step 84).

If the answer to this question is affirmative (YES), i.e. if during the post-CAT feedback control, the count of inversion of the O2 output value SVO2 with respect to the target value SVO2CMD reaches the predetermined count CTO2RVSPML), it is determined that there is satisfied the predetermined condition for excellently reflecting the air-fuel ratio of exhaust gases upstream of the catalyst 8 on the air-fuel ratio of exhaust gases downstream of the catalyst 8, and the process proceeds to the step 83, wherein the initial value update permission flag F_UAICND is set to 1. On the other hand, if the answer to the question of the step 84 is negative (NO), the present process is immediately terminated.

As described above, when the initial value update permission flag F_UAICND is set to 1, in the step 29, the adaptive law input UADP calculated immediately before interruption of the post-CAT feedback control is set as the initial value UADPWINI thereof, for updating the same, and is used as the initial value of the adaptive law input UADP at the start of the following post-CAT feedback control.

As described hereinabove, according to the present embodiment, the OSC amount OSCPM is calculated based on the actual air-fuel ratio KACT detected by the LAF sensor 22 and the exhaust gas flow rate GAIRCLAVB during the post-CAT feedback control in the state where the O2 output value SVO2 is not inverted with respect to the target value SVO2CMD. When the absolute value of the calculated OSC amount OSCPM has become not smaller than the predetermined amount OSCPMH, the initial value update permission flag F_UAICND is set to 1 (steps 82 and 83 in FIG. 7), and the adaptive law input UADP calculated immediately before interruption of the post-CAT feedback control is set as the initial value UADPWINI for use at the start of the following post-CAT feedback control, whereby the initial value UADPWINI is updated (step 29 in FIG. 4).

Further, during the post-CAT feedback control, also when the number of times of inversion of the O2 output value SVO2 with respect to the target value SVO2CMD (the inversion counter value CO2RVSPM) has become not smaller than the predetermined count CTO2RVSPML, the initial value update permission flag F_UAICND is set to 1 (steps 84 and 83 in FIG. 7), to permit the updating of the initial value UADPWINI of the adaptive law input UADP.

Therefore, only a highly reliable value of the adaptive law input UADP, which is calculated in the state where the air-fuel ratio of exhaust gases upstream of the catalyst 8 is excellently reflected on the air-fuel ratio of exhaust gases downstream of the catalyst 8, can be used as the initial value of the adaptive law input UADP at the start of the following execution of the post-CAT feedback control. This makes it possible to improve the accuracy of the air-fuel ratio control.

Further, the target air-fuel ratio KCMD is calculated by the sliding mode control such that the O2 output value SVO2 becomes equal to the target value SVO2CMD. Therefore, by performing the sliding mode control having characteristics that the O2 output value SVO2 can be caused to quickly converge to the target value SVO2CMD with little influence of a disturbance thereon, using the O2 output value SVO2 detected by the O2 sensor 21, it is possible to properly calculate the target air-fuel ratio KCMD. Further, the fuel injection amount Tout is controlled using the thus calculated target air-fuel ratio KCMD such that the actual air-fuel ratio KACT detected by the LAF sensor 22 becomes equal to the target air-fuel ratio KCMD. This makes it possible to further improve the accuracy of the air-fuel ratio control.

Next, a description will be given of an air-fuel ratio control system for an internal combustion engine, according to a second embodiment of the present invention. As compared with the air-fuel ratio control system 1 according to the first embodiment, the air-fuel ratio control system according to the second embodiment is identical in electrical configuration and mechanical configuration, but is different only in details of part of the control process. Therefore, the following description will be given mainly of points different from the air-fuel ratio control system 1 according to the first embodiment, and descriptions and illustrations of the component elements and the control process of the air-fuel ratio control system according to the second embodiment identical to those of the air-fuel ratio control system 1 according to the first embodiment are omitted.

Figure 8:
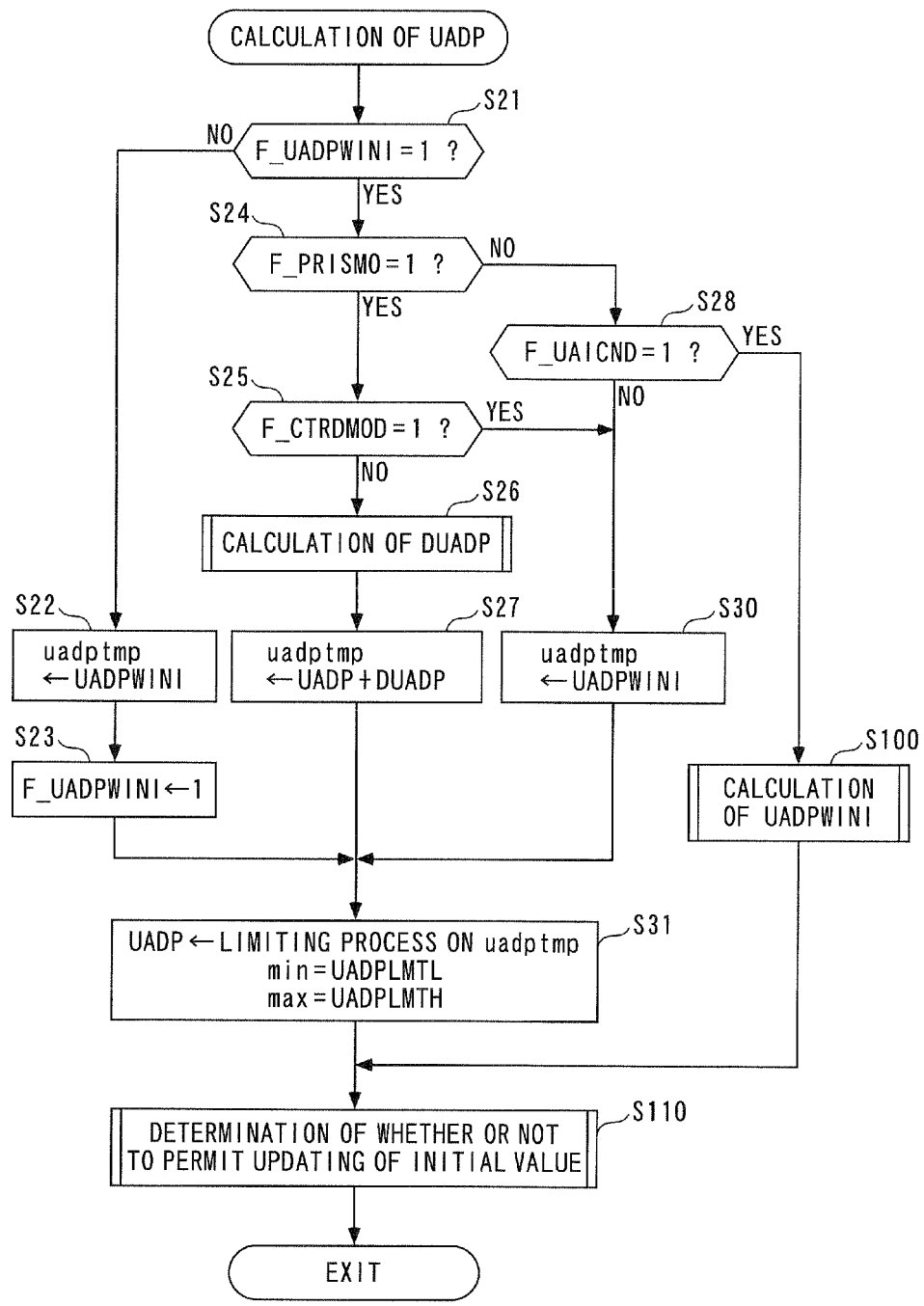
FIG. 8 is a flowchart of a subroutine for a process for calculating an adaptive law input, which is carried out by an air-fuel ratio control system according to a second embodiment of the present invention.

In the air-fuel ratio control system according to the second embodiment, the above-mentioned process for calculating the adaptive law input UADP in the step 11 in FIG. 3 is executed as shown in FIG. 8. Referring to FIG. 8, this calculation process is distinguished from the FIG. 4 calculation process only in that the process for calculating the initial value UADPWINI of the adaptive law input UADP is executed in a step 100, and in details of an update permission-determining process for determining whether or not to permit the updating of the initial value UADPWINI in a step 110. Hereinafter, a description will be given of the details of the calculation process and the initial value update permission-determining process.

Figure 9:
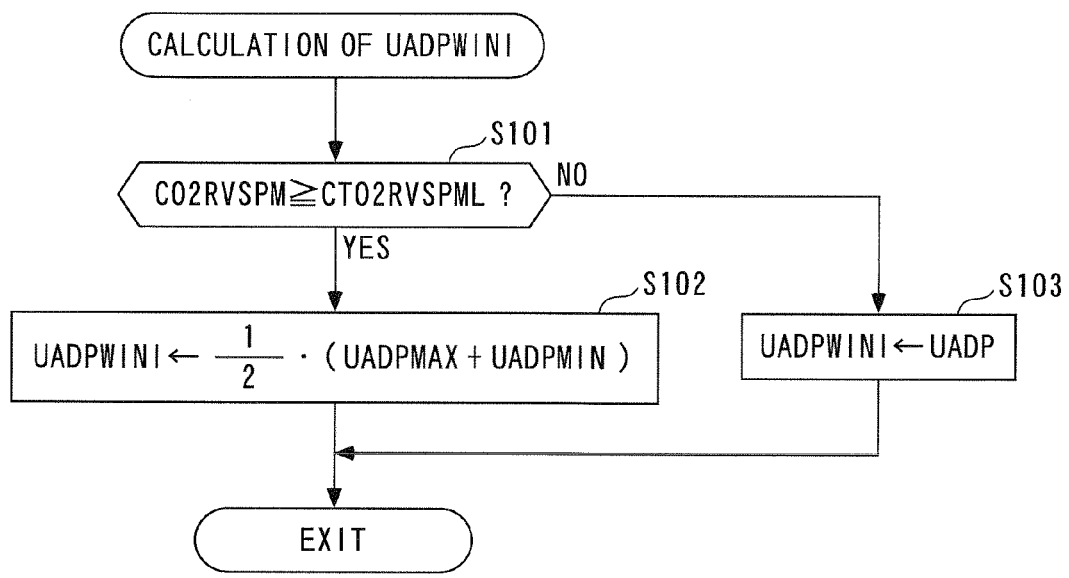
FIG. 9 is a flowchart of a subroutine for a process for calculating an initial value of the adaptive law input.

First, the process for calculating the initial value UADPWINI of the adaptive law input UADP will be described with reference to FIG. 9. As shown in FIG. 9, in this process, first, in a step 101, it is determined whether or not the inversion counter value CO2RVSPM stored in the RAM is not smaller than the predetermined count CTO2RVSPML.

If the answer to this question is affirmative (YES), i.e. if it is estimated that the O2 output value SVO2 has not converged to the O2 output value SVO2 during the post-CAT feedback control, and hence the O2 output value SVO2 is repeatedly inverted with respect to the target value SVO2CMD, the process proceeds to a step 102, wherein the initial value UADPWINI of the adaptive law input UADP is set to the arithmetic mean ((UADPMAX+UADPMIN)/2) of a maximum value UADPMAX and a minimum value UADPMIN of the adaptive law input UADP, followed by terminating the present process. These maximum value UADPMAX and minimum value UADPMIN are calculated in the update permission-determining process of the initial value UADPWINI, as will be described hereinafter.

On the other hand, if the answer to the question of the step 101 is negative (NO), i.e. if it is estimated that during the post-CAT feedback control, the O2 output value SVO2 has converged to the vicinity of the target value SVO2CMD, the process proceeds to a step 103, wherein the initial value UADPWINI of the adaptive law input UADP is set to the adaptive law input UADP stored in the RAM, followed by terminating the present process.

Figure 10:
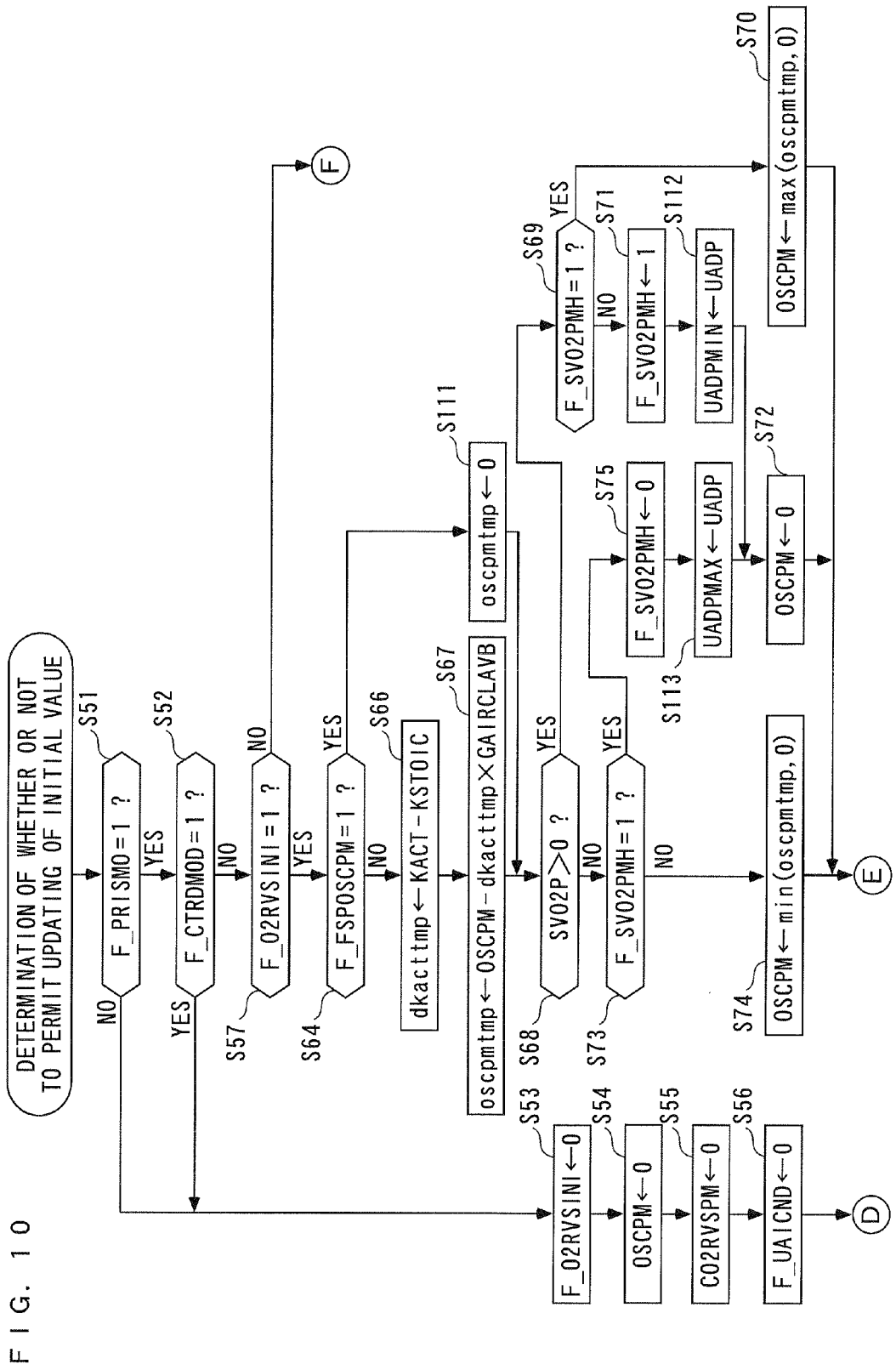
FIG. 10 is a flowchart of a subroutine for an initial value update permission-determining process for determining whether or not to permit the updating of the initial value of the adaptive law input.
Figure 11:
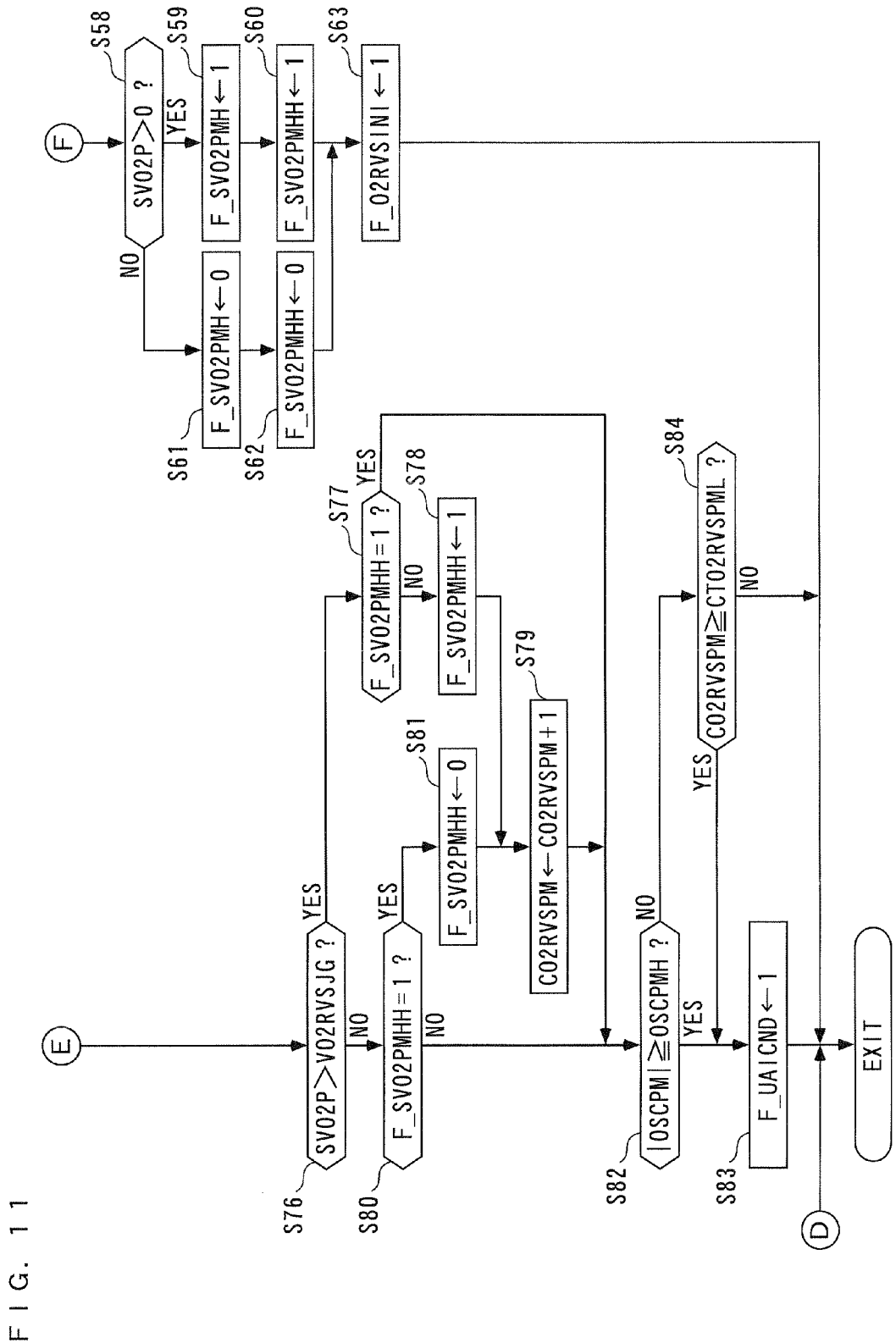
FIG. 11 is a continuation of FIG. 10.

Next, the above-mentioned update permission-determining process of the initial value UADPWINI will be described with reference to FIGS. 10 and 11. As shown in FIGS. 10 and 11, this determination process is distinguished from the determination process described above with reference to FIGS. 6 and 7 only in steps 111 to 113, and the following description is given mainly of the different steps 111 to 113.

As shown in FIG. 10, in the step 64, it is determined whether or not the failsafe flag F_FSPOSCPM is equal to 1. If the answer to this question is affirmative (YES), i.e. if the failsafe control is being executed, the process proceeds to the step 111, wherein the provisional value oscpmtmp of the OSC amount. OSCPM is set to 0. On the other hand, if the answer to the question of the step 64 is negative (NO), the steps 66 and 67 are executed, as described hereinabove.

In the step 68 following the step 67 or 111, it is determined whether or not the output difference SVO2P is larger than 0, as described hereinabove. If the answer to this question is affirmative (YES), the process proceeds to the step 69, as described above, wherein it is determined whether or not the first richer-side inversion flag F_SVO2PMH is equal to 1.

If the answer to this question is affirmative (YES), i.e. if the state where the O2 output value SVO2 is richer than the target value SVO2CMD continues, the step 70 is executed, as described above, and then the step 76 et seq. in FIG. 11 are carried out, followed by terminating the present process. On the other hand, if the answer to the question of the step 69 is negative (NO), i.e. if the O2 output value SVO2 has changed from the leaner side into the richer side with respect to the target value SVO2CMD, the step 71 is executed, as described above. Then, the process proceeds to the step 112, wherein the maximum value UADPMAX of the adaptive law input UADP is set to the adaptive law input. UADP stored in the RAM. Subsequently, as described above, after execution of the step 72, the step 76 et seq. in FIG. 11 are carried out, followed by terminating the present process.

On the other hand, if the answer to the question of the step 68 is negative (NO), in the step 73, it is determined whether or not the first richer-side inversion flag F_SVO2PMH is equal to 1, as described above. If the answer to this question is negative (NO), i.e. if the state where the O2 output value SVO2 is leaner than the target value SVO2CMD continues, as described above, the step 74 is executed, and then the step 76 et seq. in FIG. 11 are carried out, followed by terminating the present process.

On the other hand, if the answer to the question of the step 73 is affirmative (YES), i.e. if the O2 output value SVO2 has changed from the richer side into the leaner side with respect to the target value SVO2CMD, as described above, the step 75 is carried out, and then the process proceeds to the step 113, wherein the minimum value UADPMIN of the adaptive law input UADP is set to the adaptive law input UADP stored in the RAM. Subsequently, as described above, after execution of the step 72, the step 76 et seq. in FIG. 11 are carried out, followed by terminating the present process.

As described heretofore, according to the air-fuel ratio control system according to the second embodiment, when CO2RVSPM<CTO2RVSPML holds, the initial value UADPWINI of the adaptive law input UADP is set to the adaptive law input UADP stored in the RAM, so that it is possible to obtain the same advantageous effects as provided by the air-fuel ratio control system 1 according to the first embodiment.

On the other hand, if CO2RVSPM≥CTO2RVSPML holds, the initial value UADPWINI of the adaptive law input UADP is set to the arithmetic mean ((UADPMAX+UADPMIN)/2) of the maximum value UADPMAX and the minimum value UADPMIN of the adaptive law input UADP, and hence immediately before interruption of the post-CAT feedback control, even when the value of the adaptive law input UADP is unstable and is repeatedly inverted in a relatively wide range, it is possible to properly calculate the initial value UADPWINI of the adaptive law input UADP for the following execution of the feedback control. As described heretofore, it is possible to ensure high control accuracy irrespective of the relationship between the output value of the air-fuel ratio sensor and the target value thereof during the feedback control.

The present invention is by no means limited to the embodiments described above, but it can be practiced in various forms. For example, although in the above-described embodiments, the condition that the absolute value of the OSC amount OSCPM calculated as described above is not smaller than the predetermined amount and the condition that the number of times of inversion of the O2 output value SVO2 with respect to the target value SVO2CMD is not smaller than the predetermined count are used as the predetermined conditions for permitting the updating of the initial value UADPWINI of the adaptive law input UADP, this is not limitative, but only one of the above two conditions may be used. Further, the methods of calculating the OSC amount OSCPM are not limited to the methods according to the above-described embodiments, but any other suitable method may be employed.

Further, in place of or in addition to the above-described two conditions, any other suitable condition may be used as a predetermined condition insofar as it is estimated during the post-CAT feedback control that the air-fuel ratio of exhaust gases upstream of the catalyst 8 is excellently reflected on the air-fuel ratio of exhaust gases downstream of the catalyst 8.

Further, although in the above-described embodiments, the O2 sensor 21 is disposed at a location downstream of the catalyst 8, the O2 sensor 21 may be disposed at an intermediate portion of the catalyst 8. Furthermore, although in the above-described embodiments, the O2 sensor 21 is of a so-called inversion type, similarly to the upstream LAF sensor 22, a type which linearly detects the concentration of oxygen in exhaust gases may be employed.

Further, although in the above-described embodiments, the target air-fuel ratio KCMD is calculated according to the O2 output value SVO2 and the target value SVO2CMD by the sliding mode control, the target air-fuel ratio KCMD may be calculated e.g. by PID feedback control. In this case, an integral term I of the feedback control is calculated using the output difference SVO2P and an integral term gain KI by the following equation (7):

$$I(k)=KI \cdot SVO2P + I(k-1) \qquad (7)$$

The present invention is applied to the updating of the initial value of the integral term I.

Furthermore, although in the above-described embodiments, the present invention is applied to the gasoline engine installed on a vehicle, this is not limitative, but it can be applied to various engines other than the gasoline engine, and further, it can be applied to engines other than the engines for a vehicle, e.g. engines for ship propulsion machines, such as an outboard motor having a vertically-disposed crankshaft.

It is further understood by those skilled in the art that the foregoing are preferred embodiments of the invention, and that various changes and modifications may be made without departing from the spirit and scope thereof.

What is claimed is:

1. An air-fuel ratio control system for an internal combustion engine, comprising:
   a fuel injector configured to supply fuel to the internal combustion engine;
   a catalyst disposed in an exhaust passage of the engine, for purifying exhaust gases;
   an air-fuel ratio sensor disposed at a location midway or downstream of said catalyst in the exhaust passage, for detecting an air-fuel ratio of exhaust gases; and
   a control unit configured to receive the detected air-fuel ratio from the air-fuel ratio sensor and to control the fuel injector, the control unit being programmed to:
   calculate a control input to control the fuel injector including an integral term, for feedback-controlling an output value of said air-fuel ratio sensor such that the output value becomes equal to a target value, when a predetermined feedback control condition is satisfied;
   determine during the feedback control whether or not there is satisfied such a predetermined condition as in which it is estimated that the air-fuel ratio of exhaust gases upstream of said catalyst is excellently reflected on the air-fuel ratio of exhaust gases at the location midway or downstream of said catalyst;
   update and store an integral term-equivalent value equivalent to the integral term calculated during the feedback control and during a time period during which the predetermined condition is satisfied, as an initial value of the integral term for a following execution of the feedback control, when it is determined that the predetermined condition is satisfied, and suspending updating of the initial value of the integral term when it is determined that the predetermined condition is not satisfied; and
   control the fuel injector using the stored initial value stored immediately prior to an interruption of the feedback control as the initial value of the integral term at a start of the feedback control following the interruption of the feedback control.

2. The air-fuel ratio control system as claimed in claim 1, wherein the integral term-equivalent value is an integral term calculated immediately before termination of the feedback control.

3. The air-fuel ratio control system as claimed in claim 1, wherein the integral term-equivalent value is an average value of a maximum value and a minimum value of the integral term calculated during the time period during which the predetermined condition is satisfied.

4. The air-fuel ratio control system as claimed in claim 1, wherein said control unit selects one of an integral term calculated immediately before termination of the feedback control and an average value of a maximum value and a minimum value of the integral term calculated during the time period during which the predetermined condition is satisfied, as the integral term-equivalent value, according to a state of the output value of the air-fuel ratio sensor under the feedback control.

5. The air-fuel ratio control system as claimed in claim 1, further comprising:
   an upstream air-fuel ratio sensor disposed at a location upstream of said catalyst, for detecting the air-fuel ratio of exhaust gases; and
   exhaust gas flow rate-obtaining means for obtaining a flow rate of exhaust gases flowing into said catalyst, and
   wherein said control unit is further programmed to calculate an integrated value of at least one of a superfluous amount of oxygen and an insufficient amount of oxygen in exhaust gases with respect to a stoichiometric condition, during the feedback control, in a state where the output value of said air-fuel ratio sensor is not inverted with respect to the target value, based on the air-fuel ratio of exhaust gases detected by said upstream air-fuel ratio sensor and the obtained flow rate of exhaust gases, and
   wherein said control unit is further programmed to determine that the predetermined condition is satisfied, when the calculated integrated value of the amount of oxygen has become not smaller than a predetermined amount.

6. The air-fuel ratio control system as claimed in claim 2, further comprising:
   an upstream air-fuel ratio sensor disposed at a location upstream of said catalyst, for detecting the air-fuel ratio of exhaust gases; and
   exhaust gas flow rate-obtaining means for obtaining a flow rate of exhaust gases flowing into said catalyst, and
   wherein said control unit is further programmed to calculate an integrated value of at least one of a superfluous amount of oxygen and an insufficient amount of oxygen in exhaust gases with respect to a stoichiometric condition, during the feedback control, in a state where the output value of said air-fuel ratio sensor is not inverted with respect to the target value, based on the air-fuel ratio of exhaust gases detected by said upstream air-fuel ratio sensor and the obtained flow rate of exhaust gases, and
   wherein said control unit is further programmed to determine that the predetermined condition is satisfied, when the calculated integrated value of the amount of oxygen has become not smaller than a predetermined amount.

7. The air-fuel ratio control system as claimed in claim 3, further comprising:
   an upstream air-fuel ratio sensor disposed at a location upstream of said catalyst, for detecting the air-fuel ratio of exhaust gases; and
   exhaust gas flow rate-obtaining means for obtaining a flow rate of exhaust gases flowing into said catalyst, and
   wherein said control unit is further programmed to calculate an integrated value of at least one of a superfluous amount of oxygen and an insufficient amount of oxygen in exhaust gases with respect to a stoichiometric condition, during the feedback control, in a state where the output value of said air-fuel ratio sensor is not inverted with respect to the target value, based on the air-fuel ratio of exhaust gases detected by said upstream air-fuel ratio sensor and the obtained flow rate of exhaust gases, and
   wherein said control unit is further programmed to determine that the predetermined condition is satisfied, when the calculated integrated value of the amount of oxygen has become not smaller than a predetermined amount.

8. The air-fuel ratio control system as claimed in claim 4, further comprising:
   an upstream air-fuel ratio sensor disposed at a location upstream of said catalyst, for detecting the air-fuel ratio of exhaust gases; and
   exhaust gas flow rate-obtaining means for obtaining a flow rate of exhaust gases flowing into said catalyst, and
   wherein said control unit is further programmed to calculate an integrated value of at least one of a superfluous amount of oxygen and an insufficient amount of oxygen in exhaust gases with respect to a stoichiometric condition, during the feedback control, in a state where the output value of said air-fuel ratio sensor is not inverted with respect to the target value, based on the air-fuel ratio of exhaust gases detected by said upstream air-fuel ratio sensor and the obtained flow rate of exhaust gases, and
   wherein said control unit is further programmed to determine that the predetermined condition is satisfied, when the calculated integrated value of the amount of oxygen has become not smaller than a predetermined amount.

9. The air-fuel ratio control system as claimed in claim 1, wherein said control unit is further programmed to calculate a number of times of inversion of the output value of said air-fuel ratio sensor with respect to the target value during the feedback control, and
   wherein said control unit is further programmed to determine that the predetermined condition is satisfied when the calculated number of times of inversion becomes not smaller than a predetermined number.

10. The air-fuel ratio control system as claimed in claim 2, wherein said control unit is further programmed to calculate a number of times of inversion of the output value of said air-fuel ratio sensor with respect to the target value during the feedback control, and
    wherein said control unit is further programmed to determine that the predetermined condition is satisfied when the calculated number of times of inversion becomes not smaller than a predetermined number.

11. The air-fuel ratio control system as claimed in claim 3, wherein said control unit is further programmed to calculate a number of times of inversion of the output value of said air-fuel ratio sensor with respect to the target value during the feedback control, and
    wherein said control unit is further programmed to determine that the predetermined condition is satisfied when the calculated number of times of inversion becomes not smaller than a predetermined number.

12. The air-fuel ratio control system as claimed in claim 4, wherein said control unit is further programmed to calculate a number of times of inversion of the output value of said air-fuel ratio sensor with respect to the target value during the feedback control, and
    wherein said control unit is further programmed to determine that the predetermined condition is satisfied when the calculated number of times of inversion becomes not smaller than a predetermined number.

* * * * *